May 17, 1927.
H. THOMA
1,629,324
RELAY ARMATURE SUSPENSION
Original Filed March 14, 1924
Fig. 1.
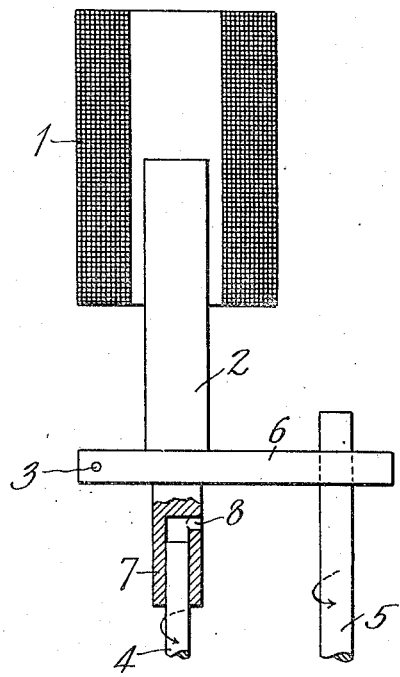
Fig. 3.
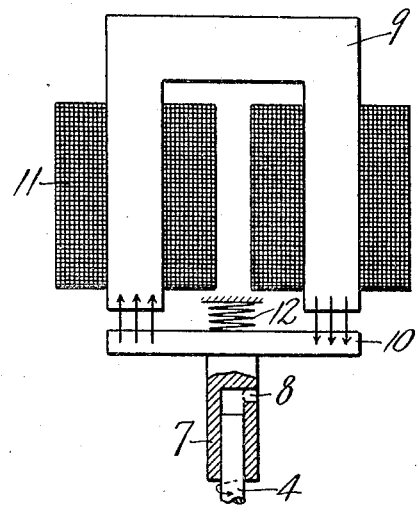
Fig. 2.
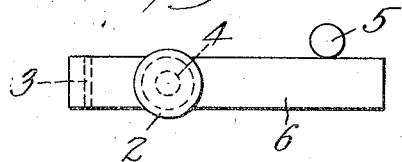
Fig. 4.
Fig. 2a.
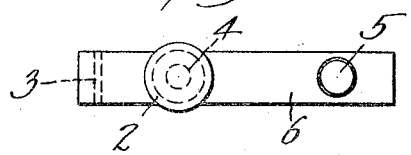
Fig. 4a.
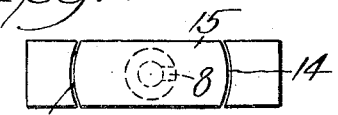
WITNESS
Oliver W. Holmes
INVENTOR.
HANS THOMA
BY
ATTORNEYS.

Patented May 17, 1927.

1,629,324

UNITED STATES PATENT OFFICE.

HANS THOMA, OF MUNICH, GERMANY, ASSIGNOR TO NEUFELDT & KUHNKE BETRIEBS-GESELLSCHAFT M. B. H., OF KIEL, GERMANY, A CORPORATION OF GERMANY.

RELAY-ARMATURE SUSPENSION.

Original application filed March 14, 1924, Serial No. 699,348, and in Germany December 4, 1922. Divided and this application filed July 6, 1926. Serial No. 120,831.

My invention relates to an anti-friction suspension of relay armatures for relays of any kind, and in particular to the armature suspension of electromagnetic relays. The disadvantage inherent to relays heretofore used in the art, whether they be responsive to electric or any other kind of energy variations, is a certain amount of sluggishness in the response of their mechanically operating armatures, due to the fact that before such an armature can respond to the forces exerted in the relay, it must overcome a certain amount of friction on its support. This is particularly true with respect to electromagnetic relays which are frequently called upon to respond to very slight changes in electric energy but which for mechanical reasons must be provided with a substantial armature. The support of such armatures, however, quite frequently, due to the friction on the support, destroys the sensitiveness of the relay response.

It is known in the prior art to utilize for instance the armature of a solenoid for performing small amounts of work, such as for instance regulating very small valves or the like, and in order to avoid friction in the suspension of such armatures, the latter are frequently guided by means of leaf springs. Such an arrangement, however, has the disadvantage that the leaf springs, particularly under the influence of alternating current which may be employed in the solenoid coils, vary the tension and become brittle, whereas the surfaces along which the armature slides, and by which it is held through the springs, produces still sufficient friction to render the response of such solenoid armatures to the currents passing through the solenoids, inaccurate. According to the present invention this disadvantage is avoided by suspending the armatures in such manner that the elements by which the armature is supported are kept in motion in a direction at right angles to that in which the armature itself moves. By these measures the friction in the direction of the regulating motion of the armature is substantially removed, since according to well known mechanical laws the friction exists always in the direction of the relative motion of the two elements between which the friction is created.

While as I have stated hereinbefore, the armature may belong to a relay responsive to any kind of energy variation, I have illustrated and described herein the improvement applied to an electromagnetic relay such as is used for controlling servo-motors described more particularly in my copending application, Serial No. 699,348, filed March 14, 1924, of which the present application is a division.

My invention is illustrated in the accompanying drawing, in which

Figure 1 shows in diagrammatic form the armature suspension of a relay for controlling any suitable mechanism, Figure 2 shows a top view of the armature;

Figure 2ª shows a top view of a modified form;

Figures 3 and 4 show diagrammatically further modified forms of armature suspensions; and Figure 4ª shows a bottom view of the armature shown in Figure 4.

The manner in which the object of my invention may be accomplished is shown in principle in Figure 1, in which 1 represents diagrammatically a solenoid coil which when energized tends to draw in the armature 2. This armature is supported on a rotatable shaft 4 such that the armature is free to move up and down according to the degree to which the solenoid is energized. At the point 3 any means may be connected which the armature is intended to operate. Now in order to avoid detrimental friction between the sleeve 7 in which shaft 4 is disposed as a guide, this shaft is rotated so that a relative motion exists permanently between the inner surfaces of sleeve 7 and the outer surface of shaft 4 which is in a direction at right angles to the direction in which the armature is moved by the solenoid, with the result that the friction in vertical direction in Figure 1 is substantially reduced to zero. In order to avoid rotation of the armature which may be caused by the rotation of shaft 4, a pin 5 may be provided against which the lateral extension 6 of armature 2 abuts, and in order to avoid friction between this extension and pin 5 in vertical direction, pin 5 may likewise be rotated permanently. Instead of placing pin 5 laterally of extension 6 on one side or the other, pin 5 may also pass through this extension as is shown in plan view in Figure 2ª.

However, the guiding of an armature such as armature 2 in Figure 1 by means of two rotating shafts, might easily cause the wedging of the armature when operated by its solenoid, for instance in case shaft 4 should have a different friction co-efficient relatively to sleeve 7 than pin 5 has relatively to extension 6. This disadvantage can be avoided by, for instance, journalling the armature on one rotatable shaft only, and by shaping the armature such that it will be attracted by the two poles of a horse-shoe electromagnet. This form is shown in Figure 3 in which 9 diagrammatically shows the core of a horse-shoe magnet energized by coils 11. The armature 10 in this case constitutes a flat bar located opposite the two poles of the magnet and being held away from the magnet by means of a spring 12. The armature is journaled as shown in Figure 1 by means of a sleeve extension 7 on a rotatable shaft 4, a hole 8 being provided at the inner end of the sleeve to permit the passage of air in and out when the armature moves up and down. In this case when shaft 4 rotates the armature 10 is prevented from following this rotation on account of the magnetic pull which the relay exerts on the two ends of the armature. In case it is desirable to permit the armature to slide part-way in between the poles of the electromagnet, it is not advisable to make the armature of rectangular shape, because in that case the corners of the armature are apt to be pulled against the poles of the electromagnet, which is further aided by the rotation of shaft 4. This would again cause an undue friction between the armature and the poles, augmented by the magnetic pull, and in that case, it is preferable to make the air space between the armature and the poles of cylindrical shape. This modification is shown in Figures 4 and 4ª, in which 9 again represents the electromagnet, 15 the armature, 12 the spring which tends to keep the armature away from the poles, 4 again represents the rotatable shaft on which armature 15 is journalled by means of sleeve 7. As will be particularly seen in Figure 4ª the air gaps 13 and 14 between the two poles of the electromagnet are of cylindrical shape so that the magnetic pull exerted upon the armature always extends in radial direction, so that shaft 4 cannot rotate the armature.

I claim:—

1. A relay responsive to energy variations having an armature mechanically moving in accordance with said energy variations, means for slidingly supporting said armature to permit it to perform its operating motions, the supporting surface of said means moving permanently in a direction at right angles to the direction in which the armature moves, and anti-friction means for preventing said armature from following said right angle movement.

2. A relay responsive to energy variations having an armature mechanically moving in accordance with said energy variations, a shaft for slidingly supporting said armature to perform its operating movements in a direction longitudinally of said shaft, said shaft rotating permanently, and anti-friction means for preventing said armature from following the rotary motions of said shaft.

3. An electromagnetic relay having a two-pole armature mechanically moving in accordance with the extent of the relay energization, a shaft for slidingly supporting said armature to permit it to perform its operating motions in a direction longitudinally of said shaft, said shaft rotating permanently, the magnetic pull exerted by the relay on the two poles of the armature preventing it from following the rotary motions of said shaft.

4. An electromagnetic relay having an armature disposed between its poles and arranged to move into and out of the range of said poles in accordance with the extent of the relay energization, a shaft for slidingly supporting said armature to permit it to perform its operating motions in a direction longitudinally of said shaft, said shaft rotating permanently, the pole faces of said relay and the pole ends of said armature having the contour of a cylinder whose axis extends in the direction of said rotating shaft, the magnetic pull exerted by said relay poles on the armature poles preventing said armature from following the rotary motion of said shaft.

HANS THOMA.